United States Patent [19]

Wassibauer et al.

[11] Patent Number: 4,829,774
[45] Date of Patent: May 16, 1989

[54] TRANSPORTABLE REFRIGERATING CONTAINER

[75] Inventors: Rudiger Wassibauer, Puch; Werner Russ, Altenmarkt, both of Austria

[73] Assignee: Franz Welz Internationale Transporte Gesellschaft mit Beschrankter Haftung, Salzburg, Austria

[21] Appl. No.: 931,111

[22] Filed: Nov. 17, 1986

[30] Foreign Application Priority Data

Nov. 28, 1985 [AT] Austria ................. 3469/85

[51] Int. Cl.⁴ ............................. F24F 3/12
[52] U.S. Cl. ....................... 62/78; 62/127; 62/179; 426/419
[58] Field of Search ............ 62/126, 127, 178, 179, 62/78, 131; 426/418, 419; 364/184, 556, 557, 418; 236/91 C, 46 R, 78 D

[56] References Cited

U.S. PATENT DOCUMENTS

| | | | |
|---|---|---|---|
| 3,415,310 | 12/1968 | Kuhlman | 62/78 X |
| 3,958,028 | 5/1976 | Burg | 426/419 X |
| 4,003,728 | 1/1977 | Rath | 62/78 |
| 4,200,910 | 4/1980 | Hall | 236/46 R |
| 4,234,926 | 11/1980 | Wallace et al. | 364/900 X |
| 4,485,863 | 12/1984 | Yoshida et al. | 165/42 |
| 4,566,282 | 1/1986 | Knoblauch et al. | 62/78 X |
| 4,566,285 | 1/1986 | Tershak et al. | 62/131 |
| 4,642,996 | 2/1987 | Harris et al. | 62/78 |
| 4,655,048 | 4/1987 | Burg | 62/78 |

FOREIGN PATENT DOCUMENTS 219377 3/1985 German Democratic Rep. .

Primary Examiner—Harry B. Tanner
Attorney, Agent, or Firm—Beveridge, DeGrandi & Weilacher

[57] ABSTRACT

The invention relates to a transportable refrigerating container in which the atmosphere is passed over a circulating device containing separating means for water and gases, in particular molecular sieves, and refrigerating and humidifying means. For adjusting the temperature to stored goods by means of a control unit, the invention provides for a blower (26) in the interior of the refrigerating container (1) to blow the atmosphere discharged from the circulating plant (4, 5, 6, 10) via the refrigerating means (11) and the humidifying means (12) in the direction of the goods stored, for the control unit (13) to be connected to all the measuring sensors (14, 15, 16, 17, 18, 19, 20) covering the individual operating parameters and to be provided with a memory unit for the set values of the operating parameters and an input unit responding to insertable data carriers for data to be externally entered and for the control unit (13) to be connected to all the switching and control means of the refrigerating container (1) and to switch the circulating plant (4, 5, 6, 10) on for determined periods on detecting deviations of operating parameters from set values.

11 Claims, 1 Drawing Sheet

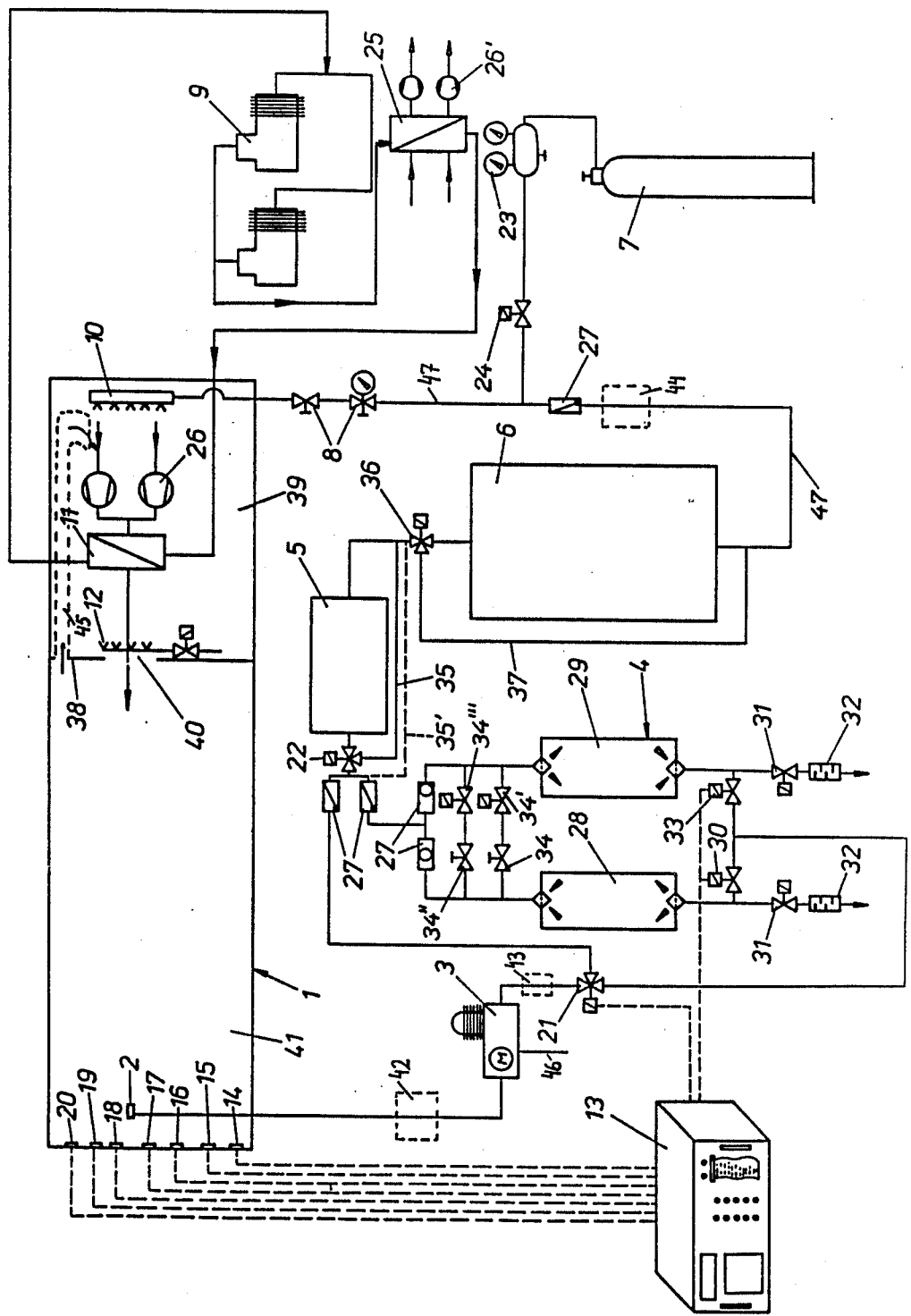

TRANSPORTABLE REFRIGERATING CONTAINER

BACKGROUND OF THE INVENTION

The invention relates to a transportable refrigerating container in which an atmosphere adjusted to goods, such as foodstuffs, stored therein, is adjusted or maintained, for which purpose atmosphere withdrawn from the refrigerating container is fed, optionally together with outside air, to a circulating device containing water removing, refrigerating, humidifying and gas removing means, in particular molecular sieves, in which undesirable gas components such as $O_2$, $N_2$, $CO_2$, ethylene and $H_2O$ steam are removable under the control of a control device, whereupon the atmosphere of modified composition is returned to the refrigerating container.

DESCRIPTION OF THE PRIOR ART

Refrigerating containers of a similar type are known, e.g., from DD-PS 219 377. The disadvantage of these devices resides in their lower flexibility and the lack of consideration of the cooling energy required.

SUMMARY OF THE INVENTION

It is the object of the invention to provide a refrigerating container properly working during transport whose energy requirement is low and in which optimal atmospheric values for the goods stored can be adjusted.

These objects are achieved in a refrigerating container of the type initially mentioned by providing for the circulating device disposed in the interior of the refrigerating container, in particular in a compartment separate from the storage space, to comprise a fan or blower blowing the atmosphere of modified composition discharged from the circulating device via the refrigerating device and the humidifying device back onto the goods stored, connecting the control device to all the measuring sensors detecting the individual operating parameters and providing a memory unit for set values of operating parameters and an input unit for external data such as duration of transport, type of goods, temperature, pressure or the like supplied on insertable data carriers such as punched cards, magnetic tapes, telephone modems, radio data transmission or the like, connecting the control device to all the switching and control units of the refrigerating container, e.g. valves, switches and the like, the control device switching on the circulating device for certain intervals on determining deviations from set values of operating parameters and optionally being provided with a recording device or a memory for the operating parameters prevailing or set during storage such as composition of the atmosphere, external and internal temperature, pressure, relative humidity and the like, the data optionally called for read-out by inputting of a code.

The refrigerating container according to the invention maintains a refrigerated atmosphere of a determined composition, in particular an atmosphere with variable concentration of the gas components nitrogen, oxygen, carbon dioxide and optionally with variable relative humidity. But it may also be desirable to maintain an inert gas atmosphere, such as of argon. Refrigerating containers of this type are provided with appropriate refrigerating machines or refrigerating devices with electric or diesel-electric drive or with a liquid nitrogen refrigerating plant for covering the refrigerating requirements arising.

The composition of the atmosphere in the refrigerating container depends on the goods to be stored. In the case of vegetables, fruit and foodstuffs, the atmosphere selected will be one of comparatively low oxygen content. In the case of other goods, such as dynamite, explosives or arms, it is preferred to have an atmosphere devoid of oxygen. In other cases it might be preferable again to select a noble gas atmosphere such as one of argon. In all cases, the problem of adjusting the initial desired atmosphere and of maintaining this during storage has to be solved. An adjustment of the desired composition of the atmosphere at the beginning of storage can be effected, for instance, by blowing in the appropriate gas compositions and displacing the air or by adding the desired components to the air or enriching it in them. In transporting toy fish, for instance, an atmosphere rich in $O_2$ is desirable, so that $N_2$ must be eliminated.

The maintenance or initial adjustment of the gas composition may prove difficult due to leakage and the differing partial pressure on the inside of the container and on its outside. Difficulties may further arise in the case of fruit by the gases generated by the fruit, namely, carbon dioxide and ethylene, which are detrimental to the gas composition in the interior of the container.

Perishable goods of vegetable or animal origin may be stored for essentially longer periods of time at a determined composition of the atmosphere without having to put up with loss of quality, although the composition of the atmosphere required for the invividual goods varies from product to product and even differs depending on the region of origin. In general, the values selected for foodstuffs will be 1 to 15 percent of oxygen, 1 to 20 percent of carbon dioxide, environmental values for nitrogen, temperatures between 0 and 15° C. and a relative humidity of 70 to 98 percent (about up to 6 g $H_2O/Nm^3$ of air. Nm=standard meter).

If the atmosphere requires equal or higher concentrations of gases than those present in the environmental air, such gases can be added to the atmosphere in order to increase individual gas concentrations over their initial values or to compensate losses of gas. Storage tanks for such gases can be carried along or provided on the vehicle. It is to be noted that the atmosphere can be composed of one gas or several gases and that all statements made herein also apply to an atmosphere composed of only one gas. Conveniently, the $CO_2$ content of the atmosphere can be increased by the provision of a $CO_2$ storage container connected to the return line for the atmosphere of modified composition. Good efficiency is obtained if the atmosphere is dried prior to the elimination of undesirable or excessively present atmospheric components, in particular prior to its feeding to molecular sieves, e.g. $O_2$ sieves. In an advantageous embodiment of the invention, the residual humidity of the atmosphere supplied to the stored goods, for instance foodstuffs, containing up to 6 g $H_2O/Nm^3$, is reduced to less than 0.1 to 0.5 g $H_2O/Nm^3$, in particular less than 0.1 to 0.2 g $H_2O/Nm^3$ (each measured in the state of normal atmospheric pressure) by separation of water prior to elimination of $O_2$ by means of a molecular sieve. This is an essential precondition for the use of an $O_2$ molecular sieve in the storage of foods, fruit or goods requiring a higher relative humidity, e.g. 50 to 96 percent, during storage.

In order to reduce the humidity contained in the atmosphere, a water separating means preceding the molecular sieves, in particular the molecular sieve for $O_2$, can be provided in the circulation cycle.

The atmosphere is circulated from the inside of the container by conveying means via the gas separating device in which the undesirable gas components are separated by control by the control unit. The control unit also controls a desired concentration increase of individual gas components by feeding these gas components from corresponding gas storage units to the interior of the container. For this purpose, the measuring signals of the measuring sensors are fed to the control unit, for instance a computer. Any readjustment of the desired set values of the components of the atmosphere is conveniently effected by providing controllers, in particular PID controllers, controlling the separating action of the gas removal device, in which controllers the controller output (correcting variable) is variable as a function of the deviation between feedback value and set value, with the controllers optionally being controlled by the central control unit as a function of the measuring signals of the measuring sensors.

The control unit controls all circulating operations, separating operations, humidity and temperature controls, concentration changes, pressure adjustments and the like by switching on and off and adjusting of the valves, motors, pumps, refrigerating device, humidifying device, blowers and the like. The control unit further comprises an input unit responding to insertable data carriers such as punched cards, magnetic tapes or the like or telephonic modems or radio receivers for data, these data carriers in particular containing data relating to the stored goods, the storage time, the composition of the atmosphere, the temperature, the pressure and the like.

A simple and space-saving construction of the refrigerating container can be achieved by providing a receptacle or molecular sieve containing molecular sieve granules for $CO_2$ and ethylene in mixed form for the simultaneous elimination of $CO_2$ and ethylene. These gases, which are mainly formed simultaneously at storage of vegetables and fruit, are thus separated simultaneously.

Particularly in view of longer lasting storage of goods under refrigeration and a certain composition of the atmosphere, it is convenient to record and store all temperatures, atmospheric compositions, atmospheric humidities, environmental temperatures and all further operating parameters in a recording unit in order to be able to determine a correct or defective operation during storage after the end of the storage period. An optimal storage program can be controlled by using the feedback values of the operating parameters and the set value data input by data carriers or stored data. In order to prevent tampering during storage, it can be provided that the regulating or control unit for determining interference in the program comprises a key-operated switch acting on its memory unit. This makes it possible to determine interference in the program or the inputting of data in the central control unit even during transports of longer duration. Conveniently, all the valves, controllers, adjusting means and the like, in particular also those which are manually actuable, are provided with sensors and at their manual actuation, the type and time of actuation are transmitted to the recording unit for storage and/or a closing means such as a door, cover or the like preventing the access to the control unit and/or recording unit and/or gas separating device and all other devices serving or the adjustment of the atmosphere and/or temperature, whose opening is sensed and recorded by the recording unit, is provided.

In known refrigerating containers, a controlled atmosphere is usually obtained by replacing the oxygen under use of liquid nitrogen containers for cooling purposes and simultaneous supply with $N_2$ and by introducing $CO_2$ by means of carbon dioxide bottles in order to establish the desired atmosphere; $O_2$ or $CO_2$ sensors serve for adjusting the atmosphere. If the concentration of the atmosphere is changed by penetrating or forming foreign gases, the concentration is restored by supplying the respective gas. As a result, these devices have a comparatively high gas and energy consumption. Compared to these systems or devices, the refrigerating container according to the invention allows a larger storage space in the case of standard size refrigerating containers or tanks, the required refrigerating, gas treatment and control devices are less elaborate, the freight rate is reduced and the radius of activities can be expanded.

In practice, the refrigerating container according to the invention for the first time permits long-range refrigeration of goods under an atmosphere of precisely determined composition over the entire cooling period. At the same time, the energy requirement of the container is minimized by providing for the permanent control of all the devices during the refrigerating operation by input parameters and the special control of the atmosphere circulating in the container. Moreover, it is noted that the adjustment of an atmosphere of a determined composition is of close relation to the cooling effect, as it was surprisingly found in practice that at optimation of the composition of the atmosphere, the refrigerating temperature can have a higher value and and the goods can thus be stored at reduced energy consumption.

A BRIEF DESCRIPTION OF THE DRAWING

The invention is explained in further detail in the accompanying drawing which is a schematic representation of a refrigeration circuit which may be utilized in a vehicle.

DESCRIPTION OF THE PREFERRED EMBODIMENT

The drawing schematically shows a refrigerating container 1 which may be transported, for instance, on a railroad car or truck. In the interior of the refrigerating container 1, a cooled atmosphere of a predetermined composition is to be adjusted or maintained. For this purpose, atmosphere is withdrawn from the container e.g. by sucking it off through at least one suction orifice 2 by means of a compressor 3. After compression, the atmopshere is fed via three-way valve 21, either directly or via water separating means 4, for instance an $H_2O$ molecular sieve, to a further three-way valve which permits the selection between the possibilities of either feeding the atmosphere largely freed of steam to a $CO_2$ and/or ethylene separating means 5, in particular a molecular $CO_2$ and/or ethylene sieve, or directly to an $O_2$ separating means 6, in particular an $O_2$ molecular sieve. Depending on the requirement or the purpose, gas separating means, in particular molecular sieves, for other gases, can be connected to the cycle. The sequence of the separating means can be any given one, merely the $H_2O$ separating means should be arranged upstream of the gas separating means, in particular the $O_2$ separators. If a concentration of a gas component of the atmosphere is to be raised above that of the environmental air, the additional gas is added, for instance, in the same way that is shown for the addition of $CO_2$ for which a $CO_2$ container 7 is provided by means of which $CO_2$ can be fed to the circulation cycle of the atmosphere via corresponding pressure adjustment and/or throttle means 23 via a valve 24. The atmospheric mixture modified in its composition is then blown back into the container 1 or the storage space via a pressure control and metering unit 8 and outflow unit 10. The modified atmospheric mixture, optionally together with the atmosphere present in the compartment or entering it, is then blown into the storage space 41 by means of a blower 26 via a cooling means or an evaporator 11 of a refrigerating plant 9 whose condenser 25 is cooled by means of a blower 26' with environmental air or by means of a water cycle provided in the container or vehicle. The atmosphere flowing out of or over the refrigerating means 11 flows over a humidifying device 12 in order to maintain an appropriate humidity in the container if this should be desired. The humidifying device 12 is fed by an $H_2O$ tank or by the $H_2$ separated in the separating means 4. Conveniently, the refrigerating device 9 is provided with two compressors in order to prevent the risk of failure. The ventilators or the blower 26 associated with the evaporator 11 simultaneously serve for distributing and circulating the atmosphere in the container 1.

As shown in the drawing, all treatment means for the atmosphere and the environmental air and the gas separating means, the control unit 13 and all other operating means can be disposed in a compartment 39 of the refrigerating container 1 which is separated from the remaining inner space of the container by a wall 38. By an orifice or a channel 40, the circulated atmosphere and/or appropriately modified environmental air is fed to the proper storage space 41 for the goods. In or in front of this channel or this orifice 40, and preferably before the humidifying device 12, the measuring sensors 14, 15, 16, 17, 18, 19 are conveniently placed so that they are flowed over by the circulating atmosphere. It is understood, however, that further measuring sensors can be provided at any given locations in the storage space 41.

In the drawing, the reference number 27 generally designates non-return valves.

The atmosphere withdrawn from the container 1 or the storage space 41 is led over the $H_2O$ separating means 4, which in the instant case is formed of $H_2O$ molecular sieves 28, 29, so that first, the one molecular sieve 28 is charged via the valve 30 and the dried atmosphere is conveyed to the three-way valve 22 via the non-return valve 27. When the molecular sieve 28 is charged with $H_2O$, the atmosphere is released of pressure via the valve 31 and the $H_2O$ separated is discharged through the outlet 32. Atmosphere charged with humidity can be fed to the molecular sieve 29 via the valve 33 and after separation of the humidity, the dry atmosphere can be recycled via the valves 34, 34', 34'', 34''' the molecular sieve 28 for completely freeing it of deposited $H_2O$.

On principle, it is to be noted that gas separating means other than molecular sieves could also be provided; the separation, particularly that of humidity, could also be effected by means of activated carbon, silica gel or the like. All separating means can consist of a plurality of molecular sieve units arranged in series. Drying by means of gas can be effected by means of an absorption drier according to the heatless principle.

According to the invention, enrichment in $N_2$ in the molecular sieve 6 is effected by withdrawing $N_2$ from the streaming atmosphere optionally enriched in environmental air via the compressor line 46, feeding it to the molecular sieve by which it is discharged into the recycling line 47 after rinsing the sieve and blown in by the discharge unit 10.

It is particularly convenient to provide for a simultaneous separation of $CO_2$ and ethylene and/or $H_2O$ in the gas separating means 5, as this is particularly space-saving.

All the functions of the refrigerating container 1, in particular the control of the valves, the switching on and off of all eletric means, in particular the motors and/or compressors, the charging of the additional gases and the throughput of the atmosphere through the circulation cycle, are controlled by the central control unit 13 and conveniently monitored thereby. For this purpose, the central control unit 13 can be supplied with the signals from an $O_2$ sensor 14 and $N_2$ sensor 15, a $CO_2$ sensor 16, an ethylene sensor 17, a temperature sensor 18, an $H_2O$ steam sensor or humidity sensor 19 and optionally at least one further sensor (such as, for instance, for further gas components, measuring values of the temperature of the goods stored, environmental temperature and the like). The function of the control unit 13 is schematically represented by control lines leading to the three-way valves 21, 30 and 33. The control lines leading to the other valves, switching means and the like are not shown. The control exerted by the control unit 13 starts with sucking the atmosphere from the refrigerating container 1 through the compressor 3 which supplies the pressure required for the throughput through the separating cycle. The control unit 13 determines, for instance, by controlling the valve 21, whether the circulated atmosphere is to pass through the drying means 4 or directly to the $CO_2$ and ethylene separator 5, depending on the humidity content of the atmosphere measured. If the goods stored are fruit, the $CO_2$ and ethylene content in the atmosphere will rise and the relative humidity will be relatively high, so that the computer will switch the valve 21 so that the atmosphere will first pass the $H_2O$ separating means 4 and then the $CO_2$ and ethylene separating means 5. If the content in $CO_2$ and/or ethylene is negligible or low, the $CO_2$ separating means 5 can be circumvented via a bypass line 35 by appropriate adjustment of the valve 22. A similar bypassing possibility of the oxygen separating means 6 is made possible by a valve 36 and a bypass line 37 if $O_2$ separation is not necessary. If the $CO_2$ and ethylene separating means also serves as an $H_2O$ separating means, the valve 22 can be omitted and the line starting out from the $H_2O$ separating means is combined with the line coming from the $CO_2$ and/or ethylene and/or $H_2O$ separating means (dotted line 35' in the drawing). On principle, any separating means can be bypassed by means of lines or valves can be provided in order to establish a desired sequence of separating or adding gases.

Humidification by means of the humidifying means 12 and refrigeration by means of the refrigerating device 9 are also effected by control of the central control unit 13.

It is particularly convenient to provide further measuring sensors for the environmental temperature and the temperature of the goods stored and to take the relation of ambient temperature to the temperature of the goods stored into appropriate consideration.

The use of molecular sieves in the individual gas separating means improves time laidup and increases the volumetric filling degree of the container, as molecular sieves take up little space. Moreover, separating means with molecular sieves are self-regenerating and of long-term use. Particularly in the case of foodstuffs such as vegetables, fruit, meat and the like requiring a high degree of humidity, particularly within the range of about 90 percent, the provision of an $H_2O$ separating means preceding the molecular sieve 5 is required for the adequate separation of $O_2$.

The atmosphere or the environmental air was compressed prior to its circulation in the separating cycle in order to increase the degree of efficiency of the molecular sieves, as higher pressure permits a higher charge of the molecular sieves with the respective gas components.

For optimation of the energy household, it is particularly convenient to use PID controllers (proportional-, integral-, differential controllers) for adjustment of the atmosphere set values and/or pressure set values and/or temperature set values as a function of the deviation of the feedback values.

The central control unit 13 which takes over all the functions of regulation and control for the means of the refrigerating container 1 is provided with an operating system with self-diagnosis so as to indicate the operating situation to the operating person at any time; it has a clock module, regulation and control modules, interfaces to the operating unit and to output units and to superior computers. Data relating to the operating condition are to be recorded and stored over extended periods such as 70 to 100 days and the memory space required therefor is to be provided. The control unit 13 is further provided with a buffered emergency power unit and a voltage monitor.

All parameters to be monitored, measured and controlled and all the required changes of condition and switching operations, in particular unauthorized changes of operating parameters and unauthorized actuation, are stored in memory units of the recording unit in order to provide evidence for the reasons of spoilage of stored goods, faulty operation and the like. Moreover, the memories used are of the type whose content does not get lost in the event of power failure and it is provided that the memory content comprising the data of the entire storage period can only be cancelled or overwritten after input of a code and/or effected printout. The computer is further associated with external message means triggering an alarm in the event of failure or required service.

The access to compartment 39 can be closed off by means of a door accessible from the outside or the like in such a manner that any opening of the door will be recorded in the recording unit. In the same way, all admissible manually operable adjusting and control means can be monitored by the recording unit in order to record type and manner of actuation.

Inputting of data in the control unit is effected, for instance, via a card reader or other reading means for data carriers, such as punched cards, magnetic tapes, telephone modems, radio data inputs and the like. Data to be entered are e.g. gas concentration, temperature, pressure, humidity, $O_2$, $N_2$, $CO_2$ and $H_2O$ content, type of goods to be stored, foreseeable duration of transport and the like. According to a program stored in the control unit 13 and/or a program especially entered for the specific goods, the control program is made by the control unit 13 and the running thereof is initiated after inputting of a starting signal and proceeds as a function of the measuring signals fed to the control unit 13 during operation.

Optionally arranged coolers 42, 43 can be provided for cooling the circulated atmosphere. The coolers 42, 43 can optionally be disposed before or after the compressor 3 in order to adjust the temperature of the atmosphere to a value suitable for the molecular sieves. In the cooler 44, the modified atmosphere can be cooled before it is recycled to the compartment 39. On appropriate dimensioning, these coolers 44 could largely replace the refrigerating means 11. The provision of the refrigerating means 11 is justified, however, in particular in the case when mainly the atmosphere withdrawn from the storage space 41 via the channel 45 is circulated or cooled and only comparatively little atmosphere has to be supplied via the circulating means for modifying the composition. During the operation of the refrigerating container, the atmosphere is circulated by the blower 26 in the storage space 41 for periods determined by the measuring values or the control unit in order to make it uniform in respect of temperature and the like; this circulation can be effected simultaneously with or independently of the circulation of the atmosphere for adjusting its composition.

The circulation of the atmosphere via the separating cycle is preferably effected as required or on determination of an exceeding of predetermined tolerance values of the gas components.

It should further be noted that in circulating the atmosphere of the container and/or in introducing environmental air (on initial adjustment of the atmosphere and/or later addition to the atmosphere), a separation of undesirable gas components can be effected in order to obtain a desired composition of the atmosphere. All statements made thus apply to the atmosphere of the container as well as to introduced environmental air.

Normally, the goods have to be unloaded from the container immediately after transport. Sudden increases in temperature, however, are decidedly detrimental, particularly if the goods are foods, such as, for instance, fruit. Condensed water is precipitated and forms mildew. According to the invention, the control unit is supplied via the input unit with a further parameter, particularly in addition to the transport time, which sets the start of a slow, continuous or stepwise increase of the storage temperature and adapts and adjusts this temperature to the environmental temperatures to be expected after opening the refrigerating container and unloading of the goods. The atmosphere itself, however, remains unchanged during the temperature increase in respect of its composition and continues to be optimally adjusted. The duration of this temperature increase is adjusted to about 1 to 3 days, preferably 2 days. The control unit preferably uses a separate regulating unit for carrying out this temperature increase. This procedure or regulating process, in addition to the quality improvement of the goods, offers a considerable saving in refrigerating energy, in particular if only liquid $N_2$ is used for cooling.

We claim:

1. A transportable refrigerating container in which an atmosphere adapted to goods to be stored therein is controlled, whereby atmosphere can be withdrawn from the refrigerating container and passed over a circulating device containing water removing, refrigerating, humidifying and gas removing means, by which means undesirable gas components are removable under the control of a control unit, whereupon the atmosphere of modified composition is recycled to the refrigerating container, comprising a container adapted for storage of goods, refrigerating means (11), humidifying means (12), a plurality of gas absorption means, a circulating device disposed in the interior of the refrigerating container (1) which is a fan or blower (26) for blowing an atmosphere of modified gas composition discharged from the circulating device (4,5,6,10) via the refrigerating means (11) and the humidifying means (12) as well as outside air back onto the goods stored in said container, a control unit (13) within said container and connected to a plurality of measuring sensors (14,15,16,17,18,19,20) located within said container and adapted for detecting the individual operating parameters within said container, including at least the $N_2$, $O_2$, $CO_2$ and $H_2O$ content of the compartment and the temperature thereof, said plurality of gas adsorption means being arranged in consecutive manner adapted to permit gas to pass therethrough and for removal of undesirable components from said gas, said control unit comprising a memory unit for a set predetermined values of the operating parameters including at least the $N_2$, $O_2$, $CO_2$ and $H_2O$ content and temperature of said compartment, and an input unit for externally entered data supplied on insertable data carriers said control unit (13) being connected to all the switching and control means of the refrigerating container (1), and adapted for switching on the circulating device (4,5,6,10) for certain time intervals on determining deviations from set values of operating parameters, said refrigerating means, humidifying means, gas adsorption means, control unit, measuring sensors, and circulating device being arranged within a compartment in said container and being separated from the storage space for the goods, said compartment being connected with said storage space for the goods by only two orifices, one of said two orifices being for withdrawing atmosphere from the storage space and the other of said orifices for introducing modified atmosphere into said storage space.

2. The refrigerating container according to claim 1, wherein prior to removal of $O_2$ of a molecular sieve, the residual humidity of the atmosphere and/or of the environmental air is controlled to less than 0.1 g of 0.5 g $H_2O/Nm^3$, by separation of water.

3. The refrigerating container according to claim 1 or 2, wherein a receptacle or molecular sieve (5) containing molecular sieve granules in mixed form is provided for the simultaneous removal of $CO_2$ and ethylene.

4. The refrigerating container according to claim 1 wherein a $CO_2$ storage means (7) connected to the recycling line for the atmosphere of modified composition is provided for increasing the $CO_2$ content of the atmosphere.

5. The refrigerating container according to claim 1 wherein for readjusting the desired set values of the atmosphere components, controllers, by means of which the separating effect of the gas removing means (4,5,6) is changeable as a function of the deviation between feedback values and set values are provided, which controllers are in turn controllable by the control unit (13) as a function of the measuring signals generated by the measuring sensors (14,15,16,17, 18,19,20).

6. The refrigerating container according to claim 1 wherein the compartment (39) containing the circulating device (4,5,6,10) is connected via an orifice or channel (40) in a separating wall (38) with a compartment (41) forming the storage space, with the measuring sensors (14,15,16,17,18,19,20) disposed in the storage space (41) in front of said orifice or channel (40).

7. Refrigerating container according to claim 1, wherein the control unit comprises a temperature increasing circuit by means of which an increase of the temperature in the storage space can be initiated and is adjustable at a predetermined period prior to the end of the storage period so that the final value of the temperature corresponds to the environmental temperature to be expected after opening of the refrigerating container.

8. The refrigerating container according to claim 2, wherein the residual humidity is controlled to less than 0.1 to 0.2 g $H_2O/Nm^3$.

9. The refrigerating container according to claim 1, wherein said circulating device contains a molecular sieve.

10. The refrigerating container according to claim 1, wherein said circulating device is disposed in a compartment (39) separate from the storage space (41).

11. The refrigerating container according to claim 1, wherein said control unit (13) is provided with a recording unit or a memory capable of providing a readout of data.

* * * * *